(12) United States Patent
Robert et al.

(10) Patent No.: US 8,455,584 B2
(45) Date of Patent: Jun. 4, 2013

(54) PROCESS FOR PREPARING A DIENE COPOLYMER COMPRISING A POLYETHER BLOCK, DIENE COPOLYMER COMPRISING A POLYETHER BLOCK, REINFORCED RUBBER COMPOSITION AND TIRE

(75) Inventors: Pierre Robert, Clermont-Ferrand (FR); Fanny Barbotin, Grenoble (FR); Jean-Michel Favrot, Cournon D-Auvergne (FR); Philippe Chaboche, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 355 days.

(21) Appl. No.: 12/666,946

(22) PCT Filed: Jun. 19, 2008

(86) PCT No.: PCT/EP2008/057816
§ 371 (c)(1),
(2), (4) Date: Jun. 14, 2010

(87) PCT Pub. No.: WO2009/000752
PCT Pub. Date: Dec. 31, 2008

(65) Prior Publication Data
US 2010/0252156 A1    Oct. 7, 2010

(30) Foreign Application Priority Data

Jun. 28, 2007 (FR) ..................................... 07 04734

(51) Int. Cl.
*C08L 53/00* (2006.01)
*C08C 19/42* (2006.01)
*C08G 81/00* (2006.01)
*B60C 1/00* (2006.01)

(52) U.S. Cl.
USPC ........... 524/505; 524/548; 524/572; 524/576; 525/331.9; 525/333.1; 525/333.2; 525/339; 525/385; 152/564

(58) Field of Classification Search
USPC ............... 524/505, 548, 572, 576; 525/331.9, 525/333.1, 333.2, 339, 385; 152/564
See application file for complete search history.

(56) References Cited

U.S. PATENT DOCUMENTS 3,134,745 A * 5/1964 Dennis ......................... 568/609
6,518,369 B2   2/2003 Scholl et al.

OTHER PUBLICATIONS

K. Van Butsele et al., "Synthesis of Novel Amphiphilic and pH-Sensitive ABC Miktoarm Star Terpolymers Synthesis of Novel Amphiphilic and pH-Sensitive ABC Miktoarm Star Terpolymers", Macromolecules, vol. 39, No. 17, pp. 5652-5656, 2006.

* cited by examiner

*Primary Examiner* — Roberto Rabago
(74) *Attorney, Agent, or Firm* — Cozen O'Connor

(57) ABSTRACT

A process for preparing, in one step, a diene block copolymer, of which at least one of these blocks is constituted of a polyether, the number-average molecular weight of which is approximately from 100 to 5000 g/mol, and at least one other of these blocks is constituted of a diene elastomer. The process according to the invention allows a high degree of grafting of the polyether to the polymer chains. Also disclosed is a reinforced rubber composition, especially intended for the manufacture of tires, comprising such a block copolymer which is intended to interact with the reinforcing filler. Such a rubber composition has improved hysteresis properties in the vulcanized state, while retaining satisfactory processing properties in the non-vulcanized state.

18 Claims, No Drawings

PROCESS FOR PREPARING A DIENE COPOLYMER COMPRISING A POLYETHER BLOCK, DIENE COPOLYMER COMPRISING A POLYETHER BLOCK, REINFORCED RUBBER COMPOSITION AND TIRE

RELATED APPLICATIONS

This is a U.S. national stage under 35 USC §371 of application No. PCT/EP2008/057816, filed on Jun. 19, 2008.

This application claims the priority of French application no. 07/04734 filed Jun. 28, 2007, the entire content of which is hereby incorporated by reference.

FIELD OF THE INVENTION

The present invention relates to a process for preparing a diene block copolymer comprising at least one polyether block. This copolymer confers, on a reinforced rubber composition containing it, improved hysteresis properties in the vulcanized state, and also advantageous processing properties in the uncured state. The invention also relates to a tire that incorporates such a composition.

BACKGROUND OF THE INVENTION

Now that savings in fuel and the need to protect the environment have become a priority, it is desirable to produce mixtures having good mechanical properties and a hysteresis which is as low as possible in order to be able to employ them in the form of rubber compositions that can be used in the manufacture of various semi-finished products incorporated into the composition of pneumatic tires, such as, for example, undertreads, side walls, treads, and in order to obtain tires having a reduced rolling resistance.

The reduction of the hysteresis of the mixtures is a permanent objective which must however be carried out while retaining the processability of the mixtures.

In order to achieve the objective of a drop in hysteresis, numerous solutions have already been tested. In particular, mention may be made of the modification of the structure of the diene polymers and copolymers at the end of polymerization by means of functionalizing, coupling or star-branching agents for the purpose of obtaining a good interaction between the polymer thus modified and the filler, whether it be carbon black or a reinforcing inorganic filler.

Within the context of a mixture containing a reinforcing inorganic filler, it has been proposed to use functionalized diene polymers in place of the unfunctionalized polymers which were used previously, and in particular polymers functionalized by alkoxysilane derivatives.

By way of illustration of this prior art relating to reinforcing inorganic fillers, mention may, for example, be made of the U.S. Pat. No. 5,066,721, which describes a rubber composition comprising a diene polymer functionalized by an alkoxysilane having at least one non-hydrolysable alkoxy residue as a mixture with silica.

One drawback of these reactions for functionalization by an alkoxysilane derivative lies in the subsequent implementation of the steam-stripping operation, which is necessary in order to remove the polymerization solvent.

Indeed, generally, experimentation shows that the functionalized polymers obtained undergo changes in the macrostructure during this stripping operation, which leads to a severe degradation of their properties, unless they are limited to using, as a functionalizing agent, an alkoxysilane belonging to a restricted family, such as that which is described in the aforementioned document U.S. Pat. No. 5,066,721.

This is the reason why research has been carried out on other functionalization reactions, still with a view to obtaining such rubber compositions.

By way of example, mention may be made of the patent EP 0 778 311 B1 in the name of the applicant, which discloses the incorporation, into rubber compositions comprising, as a reinforcing filler, predominantly silica, of diene polymers bearing, as a chain end, a silanol functional group or a polysiloxane block having a silanol end. Use is made, for example, of a functionalizing agent constituted of a cyclic polysiloxane, such as hexamethylcyclotrisiloxane. The functionalized polymers obtained may be separated from the reaction medium resulting in their formation by steam extraction of the solvent, without their macrostructure and, consequently, their physical properties changing.

It has been possible to establish that these polymers confer rubbery, especially hysteresis, properties and reinforcing properties in the crosslinked state, which are improved relative to those of control compositions based on unfunctionalized diene polymers, and which are at least analogous to those of compositions based on diene polymers comprising an alkoxysilane functional group.

However, these polymers, which comprise an active silanol functional group for coupling to silica or to carbon black which is surface-modified with silica, although giving the rubber compositions incorporating them an improvement of the hysteresis and reinforcing properties, generally result in a processability of the uncrosslinked mixtures which is impaired relative to that of unfunctionalized "control" polymers.

Other means of reducing the hysteresis have therefore been sought which allow a better processing of the mixtures.

Patent EP 1 127 909 B1 in the name of the applicant discloses a process for preparing, and the use in a vulcanizable rubber composition, of a copolymer having a polyether block at the end of the chain. This copolymer is intended to interact with the reinforcing inorganic filler so as to reduce the hysteresis of the mixture. The process for preparing this copolymer comprises a complex method of grafting the polyether block in three steps: the functionalization of the ends of living polymer chains by a cyclic organosiloxane, the reaction of the living polymer thus functionalized with a dialkyl dihalo silane, then the reaction of this Si—X (X being a halogen) functionalized polymer with a polyethylene glycol in the presence of dimethyl amino pyridine. It appears that the hysteresis properties of the rubber composition comprising the copolymer are significantly improved relative to a composition comprising a non-functional elastomer, while enabling an improved processing relative to a composition comprising an elastomer functionalized at the chain end by a silanol functional group.

U.S. Pat. No. 6,518,369 proposes a reinforced rubber composition containing a diene copolymer having a polyether block, and also a process for preparing said copolymer. The solution used consists in reacting living chains of diene elastomers with a specific polyether. Although proposing an improvement in the degree of grafting of the polyether to the chains of polymer prepared in solution, this degree of grafting remains insufficient with the process described in this patent. The grafting efficiency of the polyether block is the deciding factor for the quality of the interaction of the block copolymer with the reinforcing filler in a reinforced rubber composition, and therefore for the mechanical properties of this composition.

SUMMARY OF THE INVENTION

One object of the present invention is to overcome the above-described situation. In particular, one object is to propose a modified diene polymer of simple preparation and which interacts satisfactorily with a reinforcing filler of a rubber composition containing it in order to improve the mechanical properties of said composition.

This object is achieved in accordance with one aspect of the present invention directed to a process for the preparation of a diene block copolymer, of which at least one of its blocks is a polyether, which makes it possible to unexpectedly attain a high degree of grafting of the polyether block to the polymer chains. Such a copolymer can be used in a reinforced rubber composition, especially for the manufacture of pneumatic tires, in order to interact with the reinforcing filler. This copolymer makes it possible to significantly reduce, for the rubber composition containing it, in the crosslinked state, the degree of hysteresis and, in the uncrosslinkeded state, to optimize the processability of this composition.

In particular, by taking, as a reference, the hystereses of "control" rubber compositions containing diene elastomers that are not functionalized or else that are functionalized at the chain end by a silanol, a rubber composition containing a block copolymer according to an embodiment of the invention is characterized by a hysteresis which is more reduced than the hysteresis which relates to these "control" compositions, and also by improved processing relative to the "control" rubber compositions based on a diene polymer functionalized at the chain end.

One aspect of the invention is, therefore, a process for preparing, in one step, a diene block copolymer, of which at least one of said blocks is constituted of a polyether and at least one other of said blocks is constituted of a diene elastomer.

Another aspect of the invention is a diene block copolymer, of which at least one of said blocks is constituted of a polyether and at least another of said blocks is constituted of a diene elastomer, capable of being or directly obtained by the process according to the invention.

Another aspect of the invention is a rubber composition comprising this diene block copolymer.

One aspect of the invention is also a tire incorporating such a composition.

A process according to the an embodiment of the invention, which makes it possible to prepare a diene block copolymer, of which at least one of said blocks is constituted of a polyether and at least one other of said blocks is constituted of a diene elastomer, comprises reacting a first reactant, constituted of a living diene elastomer with a second reactant, constituted of a functionalizing agent of general formula I having a functional polyether block of number-average molecular weight approximately of 100 to 5000 g/mol, preferably of 150 to 3000 g/mol and more preferably of 300 to 2000 g/mol:

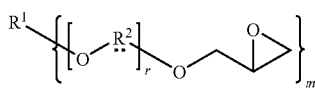

Formula I in which:
$R^1$ represents a $C_1$-$C_{15}$ alkyl, $C_6$-$C_{15}$ aryl or $C_7$-$C_{15}$ aralkyl hydrocarbon-based derivative of valency m, preferably $R^1$ represents a $C_1$-$C_4$ alkyl or alkylene radical and more preferably still $R^1$ is

—$CH_3$, —$CH_2$—$CH_2$—, —$CH_2CH(CH_3)$—;

$R^2$ represents a $C_1$-$C_{10}$ alkylene radical, particularly the

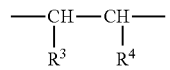

radical in which $R^3$ and $R^4$ are, independently of one another, a hydrogen atom or a $C_1$-$C_4$ alkyl radical, preferably $R^2$ is an ethylene or propylene, more preferably still ethylene, radical;

n is a number greater than 1, preferably less than 120 and more preferably an integer from 2 to 60; and m is an integer from 1 to 4, preferably 1 or 2 and more preferably m is equal to 2 so that the polyether block of the diene block copolymer prepared is situated in the middle of the chain between two blocks constituted of a diene elastomer.

Among the functionalizing agents corresponding to the general formula I, mention may be made, for example, of diethylene glycol glycidyl methyl ether (of CAS number [71712-93-1]), triethylene glycol glycidyl methyl ether (of CAS number [73692-54-3]), tetraethylene glycol glycidyl methyl ether (of CAS number [73692-52-1]), polyethylene glycol glycidyl methyl ether (of CAS number [40349-67-5]), polypropylene glycol monoglycidyl monobutyl ether (of CAS number [62412-80-0]), diethylene glycol diglycidyl ether (of CAS number [4206-61-5]), dipropylene glycol diglycidyl ether (of CAS number [41638-13-5]), triethylene glycol diglycidyl ether (of CAS number [1954-28-5]), tripropylene glycol diglycidyl ether (of CAS number [74925-61-4]), tetraethylene glycol diglycidyl ether (of CAS number [17626-93-6]), tetrapropylene glycol diglycidyl ether (of CAS number [41550-23-6]), polyethylene glycol diglycidyl ether (of CAS number [26403-72-5]), polypropylene glycol diglycidyl ether (of CAS number [26142-30-3]), and preferably suitable are polyethylene glycol glycidyl methyl ether (of CAS number [40349-67-5]) and polyethylene glycol diglycidyl ether (of CAS number [26403-72-5]).

The diene elastomer block may be random, sequential or microsequential. This block may have any appropriate microstructure, which is a function of the particular processing conditions of the polymerization reaction, such as the presence or absence of a polar and/or randomizing agent and the amounts of polar and/or randomizing agent used.

The expression "diene elastomer" is understood to mean any homopolymer obtained by polymerization of a conjugated diene monomer having 4 to 12 carbon atoms, or any copolymer obtained by copolymerization of one or more conjugated dienes with one another or with one or more vinylaromatic compounds having from 8 to 20 carbon atoms. In the case of copolymers, these contain from 20% to 99% by weight of diene units, and from 1 to 80% by weight of vinylaromatic units.

Suitable conjugated dienes which can be used in the process according to the invention are in particular 1,3-butadiene, 2-methyl-1,3-butadiene, 2,3-di($C_1$ to $C_5$ alkyl)-1,3-butadienes such as, for example, 2,3-dimethyl-1,3-butadiene, 2,3-diethyl-1,3-butadiene, 2-methyl-3-ethyl-1,3-butadiene, or 2-methyl-3-isopropyl-1,3-butadiene, phenyl-1,3-butadiene, 1,3-pentadiene, 2,4-hexadiene, etc.

Suitable vinylaromatic compounds are in particular styrene, ortho-, meta- or para-methylstyrene, the "vinyltoluene" commercial mixture, para-(tert-butyl)stirene, methoxystirenes, vinylmesitylene, divinylbenzene, vinylnaphthalene, etc.

Preferably, for this diene block, polybutadienes, butadiene-stirene copolymers and butadiene-stirene-isoprene copolymers prepared in solution and polyisoprene are suitable. Advantageously, said diene block is a butadiene-stirene copolymer prepared in solution.

Especially suitable are polybutadienes and in particular those having a content (mol %) of 1,2-units between 4% and 80% or those having a cis-1,4-content (mol %) greater than 80%, polyisoprenes, butadiene-stirene copolymers and in particular those having a $T_g$ (glass transition temperature measured according to ASTM D3418) between 0° C. and −70° C. and more particularly between −10° C. and −60° C., a stirene content between 5% and 60%, and more particularly between 20% and 50%, by weight, a content (mol %) of 1,2-bonds of the butadiene part between 4% and 75%, a content (mol %) of trans-1,4-bonds between 10% and 80%, butadiene-isoprene copolymers and especially those having an isoprene content between 5% and 90% by weight and a $T_g$ of −40° C. to −80° C., isoprene-stirene copolymers and especially those having a stirene content between 5% and 50% by weight and a $T_g$ between −25° C. and −50° C. In the case of butadiene-stirene-isoprene copolymers, those which are suitable in particular have a stirene content between 5% and 50%, and more particularly between 10% and 40%, by weight, an isoprene content between 15% and 60%, and more particularly between 20% and 50%, by weight, a butadiene content between 5% and 50%, and more particularly between 20% and 40%, by weight, a content (mol %) of 1,2-units of the butadiene part between 4% and 85%, a content (mol %) of trans-1,4-units of the butadiene part between 6% and 80%, a content (mol %) of 1,2-units plus 3,4-units of the isoprene part between 5% and 70% and a content (mol %) of trans-1,4-units of the isoprene part between 10% and 50%, and are more generally any butadiene-stirene-isoprene copolymer having a $T_g$ between −20° C. and −70° C.

The living elastomer constituting the first reactant may be obtained in a manner known per se, by an anionic route using a monofunctional or polyfunctional organometallic initiator. However, an initiator containing an alkali metal such as lithium is preferably used. Suitable organolithium initiators are in particular those comprising one or more carbon-lithium bonds. Representative compounds are aliphatic organolithium compounds such as ethyllithium, n-butyllithium (n-BuLi), isobutyllithium, polymethylene dilithium such as 1,4-dilithiobutane, etc. Monofunctional organolithium initiators are particularly preferred, especially with a view to obtaining copolymers having at least three blocks, the polyether block lying in the middle of the polymer chain between at least two blocks constituted of a diene elastomer. Lithium amides are also preferred initiators. Lithium amide is obtained from an acyclic or cyclic secondary amine, in the latter case pyrrolidine and hexamethyleneimine are highly preferred; said amide possibly being rendered soluble in a hydrocarbon solvent by virtue of the joint use of a solvating agent, an ether, for example, as described in patent FR 2 250 774.

The polymerization is preferably carried out, in a manner known per se, in the presence of an inert solvent which may be, for example, an aliphatic or alicyclic hydrocarbon such as pentane, hexane, heptane, isooctane, cyclohexane or methylcyclohexane or an aromatic hydrocarbon such as benzene, toluene or xylene.

Several types of polar agents may be used, among which non-chelating polar agents of THF type and chelating polar agents having, on at least two atoms, at least one non-bonding doublet, such as for example of tetrahydrofurfuryl ethyl ether or tetramethylethylenediamine type.

The polymerization may be carried out continuously or in batch mode. Generally, the polymerization is carried out at a temperature between 20° C. and 120° C. and preferably in the vicinity of 30° C. to 90° C.

The functionalization reaction of the living diene elastomer, obtained at the end of this polymerization step, may take place at a temperature between −20° C. and 100° C., by addition of the functionalizing agent of general formula I to the living polymer chains or vice versa. This reaction may of course have been carried out with one or more functionalizing agents corresponding to the general formula I.

The mixing may be carried out by any appropriate means, especially using any mixer having stirring of static type and/or any dynamic mixer of perfectly stirred type known by a person skilled in the art. The latter determines the reaction time between the living diene polymer and the functionalizing agent. By way of example, this time may be between 10 seconds and two hours.

According to one variant, the process of the invention may, in addition, comprise a step of functionalization, of coupling and/or of star-branching, known to a person skilled in the art, using a compound different from the functionalizing agent of general formula I, for example a coupling and/or star-branching agent comprising an atom from group IV of the Periodic Table of the Elements, such as, in particular, a tin-based derivative.

It should be noted that this additional modification of the diene elastomer may advantageously be carried out in order to regulate the cold flow of the block copolymer of the invention.

Another aspect of the invention is the diene block copolymer, at least one of said blocks being constituted of a diene elastomer and at least the other of said blocks being constituted of a polyether, capable of being or directly obtained using the preparation process described above. This block copolymer has the feature of having a high degree of grafted polyether blocks.

Preferably, the degree of grafted polyether blocks at the end of the functionalization of the living elastomer is at least 65%.

According to one variant of the invention, the diene block copolymer is a copolymer comprising at least three blocks, at least one polyether block lying in the middle of the chain between two diene elastomer blocks. Preferably, according to this variant, the copolymer according to the invention is constituted of three blocks, the polyether block lying between two diene elastomer blocks.

Another aspect of the invention is a reinforced rubber composition based on at least one diene block copolymer as described above which is intended to interact with the reinforcing filler.

The amount of polyether blocks grafted to the elastomer chains according to an embodiment of the invention allows an interaction of better quality with the reinforcing filler and therefore an improvement of the mechanical properties, especially hysteresis properties, of the reinforced composition containing the block copolymer of the invention.

The expression "based on" should be understood in the present application to mean a composition comprising the mixture and/or the product of the reaction of the various constituents used, some of the constituents being capable of, or intended to react together, at least partly, during the various manufacturing phases of the composition, in particular during the vulcanization (curing).

A rubber composition according to an embodiment of the invention is obtained by mixing, by means of thermomechanical working of said diene block copolymer, on the one hand, with a reinforcing filler and, on the other hand, with suitable additives for obtaining a vulcanizable rubber composition.

According to embodiment variants for obtaining this composition according to the invention, use is made of said block copolymer as a blend with another block copolymer according to the present invention and/or with one or more elastomers conventionally used in pneumatic tires and chosen from natural rubber, synthetic diene elastomers, which are optionally coupled and/or star-branched and/or else partially or completely functionalized by a functionalizing agent different from that used in the preparation process of the invention described above and represented by the general formula I, synthetic elastomers other than diene elastomers, or even polymers other than elastomers.

It should be noted that the improvement in the properties of the rubber composition according to the invention will be even higher when the proportion of said conventional elastomer or elastomers in the composition according to the invention is lower. Advantageously, this or these conventional elastomer(s) could, where appropriate, be present in the composition according to the invention in an amount ranging from 1 to 80 parts by weight per 100 parts by weight of diene block copolymer capable of being obtained using the preparation process of the invention described above.

The reinforcing filler of the rubber composition according to an embodiment of the invention at least one reinforcing inorganic filler.

In the present patent application, "reinforcing inorganic filler" is understood to mean, in a known way, an inorganic or mineral filler, whatever its colour and its origin (natural or synthetic), also known as "white" filler or sometimes "clear" filler, or even "non-black" filler, in contrast to carbon black (regarded as an organic filler in the context of the present description), this inorganic filler being capable of reinforcing, by itself alone, without other means than an intermediate coupling agent, a rubber composition intended for the manufacture of tires, in other words capable of replacing, in its reinforcing role, a conventional carbon black filler of tire grade. Such a filler is generally characterized, in a known way, by the presence of hydroxyl (—OH) groups at its surface, requiring in this the use of a coupling agent or system intended to provide a stable bond between the elastomer and the filler.

Advantageously, said reinforcing inorganic filler is, in its entirety or at least predominantly, silica ($SiO_2$). The silica used can be any reinforcing silica known to a person skilled in the art, in particular any precipitated or pyrogenic silica exhibiting a BET surface area and a CTAB specific surface area both of less than 450 $m^2/g$, even if highly dispersible precipitated silicas are preferred.

In the present account, the BET specific surface area is determined in a known way according to the Brunauer-Emmet-Teller method described in "The Journal of the American Chemical Society", Vol. 60, page 309, February 1938, and corresponding to Standard AFNOR-NFT-45007 (November 1987); the CTAB specific surface area is the external surface area determined according to the same Standard AFNOR-NFT-45007 of November 1987.

Highly dispersible silica is understood to mean any silica having a very high ability to deagglomerate and to disperse in an elastomer matrix observable in a known way by electron or optical microscopy on thin sections. Mention may be made, as non-limiting examples of such preferred highly dispersible silicas, of the silica Perkasil KS 430 from Akzo, the silica BV 3380 from Degussa, the silicas Zeosil 1165 MP, 1135 MP and 1115 MP from Rhodia, the silicas Hi-Sil 2000 and Hi-Sil EZ 150G from PPG, the silicas Zeopol 8715, 8755 or 8745 from Huber, as described in Application WO 03/016387, or treated precipitated silicas, such as, for example, the silicas "doped" with aluminium described in the document of Patent EP-A-735 088.

The physical state in which the reinforcing inorganic filler is present is not important, whether in the form of a powder, microbeads, granules or beads. Of course, reinforcing inorganic filler is also understood to mean mixtures of various reinforcing inorganic fillers, in particular of highly dispersible silicas as described above. Also suitable as reinforcing inorganic filler is highly dispersible alumina ($Al_2O_3$) having a BET surface area ranging from 30 to 400 $m^2/g$, more preferably between 60 and 250 $m^2/g$, and a mean particle size at most equal to 500 nm, more preferably at most equal to 200 nm, which are described in the document of European Patent EP A 810 258. Mention may in particular be made, as non-limiting examples of such reinforcing aluminas, of the aluminas "Baikalox A125" or "CR125" (Baikowski), "APA-100RDX" (Condea), "Aluminoxid C" (Degussa) or "AKP-G015" (Sumitomo Chemicals). Aluminium hydroxides are also suitable, such as those described in the document of Patent WO A 99/28376.

It should be noted that the reinforcing filler of a rubber composition according to an embodiment of the invention can comprise as a mixture, in addition to the abovementioned reinforcing inorganic filler or fillers, an organic filler, such as carbon black. However, preferably, the reinforcing inorganic filler is present in the reinforcing filler in a fraction by weight of greater than 50% and which can range up to 100%.

Suitable carbon blacks are all carbon blacks, in particular blacks of the HAF, ISAF and SAF types, conventionally used in tires and particularly in tire treads. Mention may be made, as non-limiting examples of such blacks, of the blacks N115, N134, N234, N339, N347 and N375. Suitable non-reinforcing inert fillers are particles of clay, bentonite, talc, chalk or kaolin.

As examples of organic fillers other than carbon blacks, mention may be made of the functionalized poly(vinylaromatic) organic fillers as described in Applications WO-A-2006/069792 and WO-A-2006/069793.

For example, black/silica blends or blacks partially or completely covered with silica are suitable for constituting the reinforcing filler. Also suitable are reinforcing organic fillers comprising carbon blacks covered, at least in part, with an inorganic layer, for example with silica, requiring for its part the use of a coupling agent in order to establish the bond with the elastomer, such as, without implied limitation, the fillers which are sold by Cabot under the name "CRX 2000" and which are described in the document of Patent WO-A-96137547.

In the case where the reinforcing filler contains only a reinforcing inorganic filler and carbon black, the fraction by weight of this carbon black in said reinforcing filler is preferably chosen to be less than or equal to 30%.

However, experimentation shows that the abovementioned properties of the composition according to an embodiment of the invention are further improved when the reinforcing filler which it comprises contains a greater fraction by weight of reinforcing inorganic filler, that is to say greater than 70%. Experimentation also shows that said properties are optimal when said composition contains solely a reinforcing inorganic filler, for example silica, as reinforcing filler. The latter case thus constitutes a preferred example of rubber composition according to the invention.

Preferably, the reinforcing inorganic filler is present in the composition according to an embodiment of the invention in an amount of between 20 and 200 phr, more preferably between 40 and 150 phr, the optimum being different according to the applications targeted.

The rubber composition according to an embodiment of the invention in addition conventionally comprises a reinforcing inorganic filler/elastomer matrix bonding agent.

Bonding agent is understood to mean more specifically an agent capable of establishing a satisfactory connection of chemical and/or physical nature between the filler under consideration and the elastomer, while facilitating the dispersion of this filler in the elastomer matrix. Such an at least bifunctional bonding agent has, for example, the simplified general formula "Y-T-X", in which:

Y represents a functional group ("Y" functional group) which is capable of being bonded physically and/or chemically to the inorganic filler, it being possible for such a bond to be established, for example, between a silicon atom of the coupling agent and the surface hydroxyl (—OH) groups of the inorganic filler (for example, surface silanols when silica is involved);

X represents a functional group ("X" functional group) capable of being bonded physically and/or chemically to the elastomer, for example via a sulphur atom;

T represents a divalent group which makes it possible to connect Y and X.

The bonding agents must not be confused with simple agents for covering the filler under consideration which, in a known way, can comprise the Y functional group active with regard to the filler but are devoid of the X functional group active with regard to the elastomer. Use may be made of any bonding agent known for, or capable of efficiently providing, in rubber compositions that can be used for the manufacture of tires, the bonding (or the coupling) between a reinforcing inorganic filler, such as silica, and a diene elastomer, such as, for example, organosilanes, in particular alkoxysilane polysulphides or mercaptosilanes, or also polyorganosiloxanes bearing the abovementioned X and Y functional groups. Silica/elastomer bonding agents, in particular, have been described in a large number of documents, the best known being bifunctional alkoxysilanes, such as alkoxysilane polysulphides.

Use is made in particular of alkoxysilane polysulphides, known as "symmetrical" or "asymmetrical", according to their specific structure, as described, for example, in U.S. Pat. Nos. 3,842,111, 3,873,489, 3,978,103, 3,997,581, 4,002,594, 4,072,701 and 4,129,585 or in the more recent U.S. Pat. Nos. 5,580,919, 5,583,245, 5,650,457, 5,663,358, 5,663,395, 5,663,396, 5,674,932, 5,675,014, 5,684,171, 5,684,172, 5,696,197, 5,708,053, 5,892,085, EP A 1 043 357, WO 03/002648 (or US 2005/0016651) and WO 03/002649 (or US 2005/0016650), which set out in detail such known compounds.

Suitable in particular, without the definition below being limiting, are symmetrical alkoxysilane polysulphides corresponding to the following general formula (II):

$$Z\text{-}A\text{-}S_{n'}\text{-}A\text{-}Z, \text{ in which:} \quad (II)$$

n' is an integer from 2 to 8 (preferably from 2 to 5);

A is a divalent hydrocarbon radical (preferably $C_1$-$C_{18}$ alkylene groups or C6-C12 arylene groups, more particularly $C_1$-$C_{10}$ alkylenes, in particular $C_1$-$C_4$ alkylenes, in particular propylene);

Z corresponds to one of the following formulae:

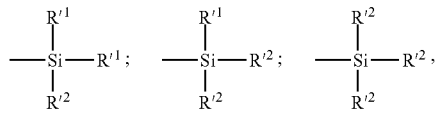

in which:

the substituted or unsubstituted $R^{i1}$ radicals, which are identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);

the substituted or unsubstituted $R^{i2}$ radicals, which are identical to or different from one another, represent a hydroxyl, $C_1$-$C_{18}$ alkoxyl or $C_5$-$C_{18}$ cycloalkoxyl group (preferably $C_1$-$C_8$ alkoxyl or $C_5$-$C_8$ cycloalkoxyl groups, more preferably $C_1$-$C_4$ alkoxyl groups, in particular methoxyl and/or ethoxyl).

In the case of a mixture of alkoxysilane polysulphides corresponding to the above formula (II), in particular normal commercially available mixtures, it will be understood that the mean value of the "n'" symbols is a fractional number, preferably ranging from 2 to 5 and more preferably approximately 4.

Mention will more particularly be made, as alkoxysilane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis (triethoxysilylpropyl) disulphide, abbreviated to TESPD, of formula $[(C_2H_5O)_3Si(CH_2)_3S]_2$. TESPD is sold, for example, by Degussa under the names Si266 or Si75 (in the second case, in the form of a mixture of disulphide (at 75% by weight) and of polysulphides) or by Witco under the name Silquest A1589. TESPT is sold, for example, by Degussa under the name Si69 (or X50S, when it is supported at 50% by weight on carbon black) or by Osi Specialties under the name Silquest A1289 (in both cases, commercial mixture of polysulphides with a mean value for n' which is approximately 4). Mention will also be made of bis(mono($C_1$-$C_4$) alkoxyldi($C_1$-$C_4$)alkylsilylpropyl)polysulphides (in particular disulphides, trisulphides or tetrasulphides), more particularly bis(monoethoxy-dimethylsilylpropyl) tetrasulphide (abbreviated to MESPT) or disulphide, which form the subject-matter of International Patent Application WO 02/083782 (or US 2004/0132880) on behalf of the Applicant Companies.

Mention will in particular be made, as examples of bonding agents other than the abovementioned alkoxysilane polysulphides, of bifunctional polyorganosiloxanes (PUS) or of hydroxysilane polysulphides, such as described in Applications WO 02/30939 (or U.S. Pat. No. 6,774,255) and WO 02/31041 (or US 2004/051210), or else silanes or POS bearing azodicarbonyl groups, as described, for example, in Patent Applications WO 2006/125532, WO 2006/125533 and WO 2006/125534.

In the compositions in accordance with embodiments of the invention, the level of bonding agent is advantageously less than 20 phr, it being understood that it is generally desirable to use the least possible thereof. Its level is preferably between 0.5 and 12 phr, more preferably 3 and 10 phr, in particular from 4 to 7 phr.

The compositions in accordance with embodiments of the invention also comprise, in addition to said diene block copolymer according to the invention, and said reinforcing inorganic filler, plasticizers, pigments, antioxidants, antifatigue agents, antiozonant waxes, adhesion promoters, reinforcing or plasticizing resins, for example as described in the document WO 02/10269, peroxides and/or bismaleimides, methylene acceptors (for example, phenolic novolac resin) or methylene donors (for example, HMT or H3M), a crosslinking system based either on sulphur and/or on peroxides and/or on bismaleimides, crosslinking activators comprising zinc monoxide and stearic acid, guanidine derivatives (in particular diphenylguanidine), extending oils, one or more agents for covering silica, such as alkoxysilanes, polyols or amines.

In particular, these compositions can be such that said diene block copolymer according to the invention is extended with an aromatic or non-aromatic or very slightly aromatic oil chosen from the group consisting of a paraffinic oil, a naphthenic oil, MES oil, TDAE oil, glycerol esters, plasticizing hydrocarbon resins exhibiting a high $T_g$ preferably of greater than 25° C. and the mixtures of such plasticizers, with an amount of extending oil of between 0 and 50 phr.

The vulcanizable rubber composition in accordance with an embodiment of the invention may be prepared according to a process comprising the following steps:

(i) carrying out, at a maximum temperature of between 130° C. and 200° C., a first step of thermomechanical working (sometimes described as "non-productive" phase) of the base constituents necessary, with the exception of the crosslinking system, for said composition comprising at least one diene block copolymer according to the invention and a reinforcing filler, then (ii) carrying out, at a temperature lower than said maximum temperature of said first step, preferably of less than 120° C., a second step of mechanical working during which said crosslinking system is incorporated, (iii) extruding or calendering the rubber composition thus obtained, in the desired form, in order to manufacture semi-finished products, such as treads.

This process can also comprise, prior to carrying out the aforementioned stages (i), (ii) and (iii), the stages for the preparation of a diene block copolymer, prepared according to the process of the invention, namely in a first stage, the reaction of the monomer(s), in the presence or absence of an inert hydrocarbon solvent, in the presence or absence of a polar agent, with a polymerization initiator, in order to form a living diene elastomer, and the reaction, in a second stage, of said living elastomer with the functionalizing agent of general formula I, in order to obtain the diene block copolymer. The preparation of the diene block copolymer may also comprise a stage of supplementary functionalization, coupling and/or star-branching as described previously according to a variant of the process.

Another aspect of the invention is a tire that incorporates, in at least one of its constituent components, a rubber composition such as that mentioned above, and more particularly semi-finished articles of a tire that comprise this composition.

Due to the reduced hysteresis which characterizes a rubber composition according to the invention in the vulcanized state, it should be noted that a tire having a tread comprising said composition exhibits an advantageously reduced rolling resistance. Another subject of the invention is therefore a tire tread which is such that it comprises a crosslinkable or crosslinked rubber composition such as that mentioned above or else which is such that it is composed of this composition.

The abovementioned characteristics of embodiments of the present invention, and others, will be better understood on reading the following description of several exemplary embodiments of the invention, given by way of illustration and non-limitingly.

EXEMPLARY EMBODIMENTS OF THE INVENTION

I Preparation of the Polymers

A) Measurements and Tests Used

Experimental techniques used for the pre-curing characterization of the polymers obtained:

(a) The SEC (Size Exclusion Chromatography) technique is used, which makes it possible to separate the macromolecules in solution, according to their size, through columns filled with a porous gel. The macromolecules are separated according to their hydrodynamic volume, the bulkiest being eluted first.

Without being an absolute method, SEC makes it possible to determine the distribution of the molecular weights of a polymer. From commercial standard products, the various number-average molecular weights ($M_n$) and weight-average molecular weights ($M_w$) can be determined and the polymolecularity index ($I_p=M_w/M_n$) calculated via a "Moore" calibration.

There is no particular treatment of the polymer sample before analysis. This sample is simply dissolved in tetrahydrofuran at a concentration of around 1 g/l. Then the solution is filtered through a filter with a porosity of 0.45 µm before injection.

The equipment used is a "Waters Alliance" chromatograph. The elution solvent is tetrahydrofuran and the temperature of the system is 35° C. Two sets of columns and corresponding chromatographic conditions can then be used:

1—A set of four Waters columns in series, having the trade names STYRAGEL HMW7, STYRAGEL HMW6E and two STYRAGEL HT6E columns with a flow rate of 0.7 ml/min.

2—A set of two Waters columns having the trade name STYRAGEL HT6E with a flow rate of 1 ml/min.

The injected volume of the solution of the polymer sample is 100 µl. The detector is a Waters 2410 differential refractometer and the operating software for the chromatographic data is the Waters Empower system.

The average molecular weights calculated are relative to a calibration curve produced for SBRs having the following microstructure: 25 wt % of styrene type units, 23 wt % of 1,2-type units and 50 wt % of trans-1,4-type units.

(b) For the polymers and the rubber compositions, the Mooney viscosities ML (1+4) at 100° C. are measured according to the ASTM D 1646 standard.

Use is made of an oscillating consistometer as described in the ASTM D 1646 standard. The Mooney plasticity measurement is carried out according to the following principle: the composition in the raw state (i.e. before curing) is moulded in a cylindrical chamber heated to 100° C. After preheating for one minute, the rotor rotates within the test specimen at 2 rpm and the working torque for maintaining this movement is measured after rotating for four minutes. The Mooney plasticity (ML 1+4) is expressed in "Mooney units" (MU, with 1 MU=0.83 N.m).

(c) The glass transition temperatures $T_g$ of the polymers are measured using a differential scanning calorimeter.

(d) The NMR analyses are carried out on a 500 MHz Bruker spectrometer equipped with a 5 mm BBIz "broadband" probe. For the quantitative $^1H$ NMR experiment, the sequence uses a 30° pulse and a repetition time of two seconds. The samples are dissolved in carbon sulphide ($CS_2$). 100 µL of deutered cyclohexane ($C_6D_{12}$) are added for the lock signal.

The $^1H$ NMR spectrum makes it possible to quantify the ether functional group by integration of the signal characteristic of the protons of the $OCH_2$ group, situated in the vicinity of δ=3.4 ppm and the $(CH_3)_2Si$ functional group by integration of the signal characteristic of the $SiCH_3$ protons in the vicinity of δ=0 ppm.

The 2D $^1H$—$^{29}Si$ NMR spectrum makes it possible to verify the nature of the functional group by virtue of the chemical shift values of the silicon nuclei and of the protons in the $^2J$ vicinity (via 2 bonds).

(e) Near infrared (NIR) spectroscopy is used to quantitatively determine the weight content of stirene in the elastomer and also its microstructure (relative distribution of the 1,2-vinyl, trans-1,4- and cis-1,4-butadiene units). The principle of the method rests on the Beer-Lambert law applied to a multicomponent system. Since the method is indirect, it calls for a multivariate calibration [Vilmin, F.; Dussap, C.; Coste, N. *Applied Spectroscopy* 2006, 60, 619-29] carried out using standard elastomers having a composition determined by $^{13}C$ NMR. The stirene content and the microstructure are then calculated from the NW spectrum of an elastomer film of around 730 μm in thickness. The acquisition of the spectrum is carried out in transmission mode between 4000 and 6200 cm$^{-1}$ with a resolution of 2 cm$^{-1}$, using a Bruker Tensor 37 Fourier transform near infrared spectrometer equipped with a Peltier-cooled InGaAs detector.

(f) For the polymers, the inherent viscosity at 25° C. of a 0.1 g/dl solution of polymer in toluene is measured, starting from a dry polymer:

Principle:

The inherent viscosity is determined by the measurement of the flow time t of the polymer solution and of the flow time $t_0$ of toluene, in a capillary tube.

The flow time of toluene and the flow time of the 0.1 g/dl polymer solution are measured in a precalibrated Ubbelhode tube (diameter of the capillary: 0.46 mm, capacity of 18 to 22 ml), placed in a bath thermostatically controlled at 25±0.1° C.

The inherent viscosity is obtained by the following relationship:

$$\eta_{inh} = \frac{1}{C} \ln \left[ \frac{\left(t - \frac{H}{t}\right)}{\left(t_0 - \frac{H}{t_0}\right)} \right]$$

with:
C: concentration of the toluene solution of polymer in g/dl;
t: flow time of the toluene solution of polymer in seconds;
$t_o$: flow time of the toluene in seconds;
$\eta_{inh}$: inherent viscosity expressed in dl/g; and
H: calibration constant of the tube.

B) Preparation of the Polymers

EXAMPLE 1

Polymer A According to the Invention

Injected into a 10-litre reactor, kept under a nitrogen pressure of 2 bar, containing 5300 g of cyclohexane, are 140 g of stirene and 390 g of butadiene and also 3.3 mL of tetrahydrofuran and 1.6 mmol of sodium tert-amylate. After neutralizing the impurities in the solution to be polymerized by addition of n-butyllithium, 5.30 mmol of n-BuLi are added. The polymerization is carried out at 50° C.

After 49 min, the conversion rate of the monomers reaches 95%. This conversion rate is determined by weighing an extract dried at 110° C. under a reduced pressure of 200 mmHg. A control sample is then withdrawn from the reactor, then halted with an excess of methanol with respect to the lithium. The inherent viscosity ("initial" viscosity), which is measured at 25° C. at 0.1 g/dl in toluene, is 1.03 dl/g. The molecular weight $M_n$ of this control, determined by the SEC technique, is 75000 g/mol, the $I_p$ is 1.11.

The temperature of the reactor is increased to 60° C. and 2.6 mmol of a 0.11 mol.L$^{-1}$ solution of poly(ethylene glycol) diglycidyl ether (of CAS number [26403-72-5] sold by Aldrich under the reference 475696 with an $M_n$ indicated by this supplier of 526 g.mol$^{-1}$) are then injected into the previously deaerated toluene.

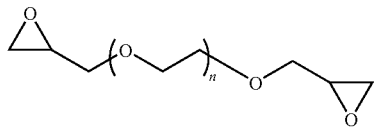

After reacting for 60 min at 60° C., the reaction is halted by addition of 8.0 mL of methanol. The "final" inherent viscosity measured is 1.54 dL/g. The jump in viscosity, defined as the ratio of said "final" viscosity to said "initial" viscosity, is 1.49 in this instance. The ML viscosity of the polymer thus coupled is 27.

The diene block copolymer A is then subjected to an antioxidizing treatment by addition of 0.44 part per 100 parts of rubbers (phr) of 4,4'-methylenebis(2,6-tert-butylphenol) and 0.11 part per 100 parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The molecular weight $M_n$ of this block copolymer A, determined by the SEC technique, is 121 000 g/mol and the $I_p$ is 1.31. The mathematical breakdown of the SEC chromatogram to the sum of Gaussian distributions (assuming that the response coefficients of the refractometric detector (dn/dc) of the various populations are identical) indicates the presence of a residual population of uncoupled linear chains in an amount of 19% by weight.

The content of $OCH_2$ functional groups determined by $^1H$ NMR for the copolymer A is 72 mmol/kg which, considering the theoretical molecular weight $M_n$ of the diene polymer and that of the polyethylene glycol block corresponds to a degree of functionalization by the polyether block of around 65%.

The microstructure of this copolymer A is determined by the NIR method:

The weight content of trans-1,4-units is 34%, that of cis-1,4-units is 28% and that of 1,2-units is 38% (each of these three contents relates to butadiene units).

The weight content of stirene is 25%.

EXAMPLE 2

Polymer B According to the Invention

Injected into a 10-litre reactor, kept under a nitrogen pressure of 2 bar, containing 5300 g of cyclohexane, are 140 g of stirene and 390 g of butadiene and also 4.6 mL of tetrahydrofuran and 1.4 mmol of sodium tert-amylate. After neutralizing the impurities in the solution to be polymerized by addition of n-butyllithium, 4.77 mmol of n-BuLi are added. The polymerization is carried out at 50° C.

After 42 min, the conversion rate of the monomers reaches 95%. This conversion rate is determined by weighing an extract dried at 110° C. under a reduced pressure of 200 mmHg. A control sample is then withdrawn from the reactor, then halted with an excess of methanol with respect to the lithium. The inherent viscosity ("initial" viscosity), which is measured at 25° C. at 0.1 g/dl in toluene, is 1.07 dl/g. The molecular weight $M_n$ of this control, determined by the SEC technique, is 83000 g/mol, the $I_p$ is 1.08.

The temperature of the reactor is increased to 60° C. and 2.4 mmol of a 0.091 mol.L$^{-1}$ solution of poly(ethylene glycol)diglycidyl ether (of CAS number [26403-72-5] sold by Aldrich under the reference 475696 with an $M_n$ indicated by this supplier of 526 g.mol$^{-1}$) are then injected into the previously deaerated toluene.

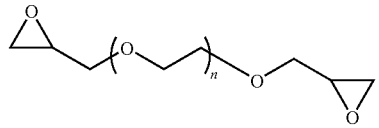

After reacting for 60 min at 60° C., the reaction is halted by addition of 7.2 mL of methanol. The "final" inherent viscosity measured is 1.60 dL/g. The jump in viscosity, defined as the ratio of said "final" viscosity to said "initial" viscosity, is 1.50 in this instance. The ML viscosity of the polymer thus coupled is 34.

The diene block copolymer B is then subjected to an antioxidizing treatment by addition of 0.44 part per 100 parts of rubbers (phr) of 4,4'-methylenebis(2,6-tert-butylphenol) and 0.11 part per 100 parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The molecular weight $M_n$ of this block copolymer B, determined by the SEC technique, is 131 000 g/mol and the $I_p$ is 1.30. The mathematical breakdown of the SEC chromatogram to the sum of Gaussian distributions (assuming that the response coefficients of the refractometric detector (dn/dc) of the various populations are identical) indicates the presence of a residual population of uncoupled linear chains in an amount of 24% by weight.

The content of $OCH_2$ functional groups determined by $^1H$ NMR for the copolymer B is 72 mmol/kg which, considering the theoretical molecular weight $M_n$ of the diene polymer and that of the polyethylene glycol block corresponds to a degree of functionalization by the polyether block of around 70%.

The microstructure of this copolymer B is determined by the NIR method:

The weight content of trans-1,4-units is 34%, that of cis-1,4-units is 27% and that of 1,2-units is 39% (each of these three contents relates to butadiene units).

The weight content of stirene is 25%.

EXAMPLE 3

Polymer C According to the Invention

Injected into a 10-litre reactor, kept under a nitrogen pressure of 2 bar, containing 5200 g of cyclohexane, are 135 g of stirene and 385 g of butadiene and also 4.5 mL of tetrahydrofuran and 1.2 mmol of sodium tert-amylate. After neutralizing the impurities in the solution to be polymerized by addition of n-butyllithium, 3.95 mmol of n-BuLi are added. The polymerization is carried out at 50° C.

After 56 min, the conversion rate of the monomers reaches 97%. This conversion rate is determined by weighing an extract dried at 110° C. under a reduced pressure of 200 mmHg. A control sample is then withdrawn from the reactor, then halted with an excess of methanol with respect to the lithium. The inherent viscosity ("initial" viscosity), which is measured at 25° C. at 0.1 g/dl in toluene, is 1.19 dl/g. The molecular weight $M_n$ of this control, determined by the SEC technique, is 95000 g/mol, the $I_p$ is 1.10.

The temperature of the reactor is increased to 60° C. and 1.98 mmol of a 0.091 mol.L$^{-1}$ solution of poly(ethylene glycol)diglycidyl ether (of CAS number [26403-72-5] sold by Aldrich under the reference 475696 with an $M_n$ indicated by this supplier of 526 g.mol$^-$) are then injected into the previously deaerated toluene.

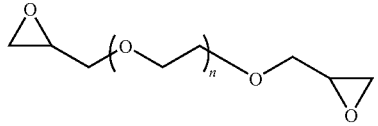

After reacting for 60 min at 60° C., the reaction is halted by addition of 7.2 mL of methanol. The "final" inherent viscosity measured is 1.79 dL/g. The jump in viscosity, defined as the ratio of said "final" viscosity to said "initial" viscosity, is 1.50 in this instance. The ML viscosity of the polymer thus coupled is 53.

The diene block copolymer C is then subjected to an antioxidizing treatment by addition of 0.44 part per 100 parts of rubbers (phr) of 4,4'-methylenebis(2,6-tert-butylphenol) and 0.11 part per 100 parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The molecular weight $M_n$ of this block copolymer C, determined by the SEC technique, is 147 000 g/mol and the $I_p$ is 1.37. The mathematical breakdown of the SEC chromatogram to the sum of Gaussian distributions (assuming that the response coefficients of the refractometric detector (dn/dc) of the various populations are identical) indicates the presence of a residual population of uncoupled linear chains in an amount of 24% by weight.

The content of $OCH_2$ functional groups determined by $^1H$ NMR for the copolymer C is 59 mmol/kg which, considering the theoretical molecular weight $M_n$ of the diene polymer and that of the polyethylene glycol block corresponds to a degree of functionalization by the polyether block of around 68%.

The microstructure of this copolymer C is determined by the NIR method:

The weight content of trans-1,4-units is 33%, that of cis-1,4-units is 28% and that of 1,2-units is 39% (each of these three contents relates to butadiene units).

The weight content of stirene is 25%.

EXAMPLE 4

Polymer D According to the Invention

Injected into a 10-litre reactor, kept under a nitrogen pressure of 2 bar, containing 5200 g of cyclohexane, are 135 g of stirene and 385 g of butadiene and also 4.5 mL of tetrahydrofuran and 1.3 mmol of sodium tert-amylate. After neutralizing the impurities in the solution to be polymerized by addition of n-butyllithium, 3.6 mmol of n-BuLi are added. The polymerization is carried out at 50° C.

After 53 min, the conversion rate of the monomers reaches 96%. This conversion rate is determined by weighing an extract dried at 110° C. under a reduced pressure of 200 mmHg. A control sample is then withdrawn from the reactor, then halted with an excess of methanol with respect to the lithium. The inherent viscosity ("initial" viscosity), which is measured at 25° C. at 0.1 g/dl in toluene, is 1.30 dl/g. The molecular weight $M_n$ of this control, determined by the SEC technique, is 105000 g/mol, the $I_p$ is 1.08.

The temperature of the reactor is increased to 60° C. and 1.82 mmol of a 0.072 mol.L$^{-1}$ solution of poly(ethylene glycol)diglycidyl ether (of CAS number [26403-72-5] sold by Aldrich under the reference 475696 with an $M_n$ indicated by this supplier of 526 g.mol$^{-1}$) are then injected into the previously deaerated toluene.

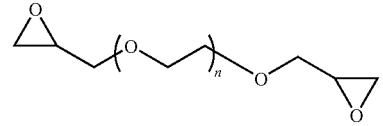

After reacting for 60 min at 60° C., the reaction is halted by addition of 5.6 mL of methanol. The "final" inherent viscosity measured is 1.95 dL/g. The jump in viscosity, defined as the ratio of said "final" viscosity to said "initial" viscosity, is 1.50 in this instance. The ML viscosity of the polymer thus coupled is 66.

The diene block copolymer D is then subjected to an antioxidizing treatment by addition of 0.44 part per 100 parts of rubbers (phr) of 4,4'-methylenebis(2,6-tert-butylphenol) and 0.11 part per 100 parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The molecular weight $M_n$ of this block copolymer D, determined by the SEC technique, is 172 000 g/mol and the $I_p$ is 1.36. The mathematical breakdown of the SEC chromatogram to the sum of Gaussian distributions (assuming that the response coefficients of the refractometric detector (dn/dc) of the various populations are identical) indicates the presence of a residual population of uncoupled linear chains in an amount of 26% by weight.

The content of $OCH_2$ functional groups determined by $^1H$ NMR for the copolymer D is 52 mmol/kg which, considering the theoretical molecular weight $M_n$ of the diene polymer and that of the polyethylene glycol block corresponds to a degree of functionalization by the polyether block of around 65%.

The microstructure of this copolymer D is determined by the NIR method:

The weight content of trans-1,4-units is 31%, that of cis-1,4-units is 25% and that of 1,2-units is 44% (each of these three contents relates to butadiene units).

The weight content of stirene is 26%.

EXAMPLE 5

"Control" Polymer E: SBR Having an SiOH Functional Group at the Chain End

Injected into a 100-litre reactor, kept under a nitrogen pressure of around 2 bar, containing 49.7 kg of cyclohexane, are 1.95 kg of stirene and 5.26 kg of butadiene and also 672 mL of a 0.0308 mol.L$^{-1}$ solution of sodium tert-amylate in cyclohexane. After neutralizing the impurities in the solution to be polymerized by addition of n-butyllithium, 729 mL of n-BuLi at 0.0598 mol.L$^{-1}$ in cyclohexane are added. The polymerization is carried out at 45° C.

After 110 min, the conversion rate of the monomers reaches 94%. This conversion rate is determined by weighing an extract dried at 110° C., under a reduced pressure of 200 mmHg.

372 mL of a 0.0586 mol.L$^{-1}$ solution of hexamethylcyclotrisiloxane in cyclohexane are then added. After 30 min at 60° C., 0.78 L of a 0.1 mol.L$^{-1}$ solution of methanol in toluene is then added. The inherent viscosity, which is measured at 25° C. at 0.1 g/dl in toluene, is 1.50 dl/g. The polymer is subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The ML viscosity of the copolymer is 31.

The molecular weight $M_n$ of this copolymer, determined by the SEC technique, is 142 000 g/mol and the $I_p$ is 1.10.

The microstructure of this copolymer E is determined by the NIR method:

The weight content of trans-1,4-units is 30%, that of the cis-1,4-units is 28% and that of the 1,2-units is 42% (each of these three contents relates to the butadiene units).

The weight content of stirene is 26%.

The content of $(CH_3)_2Si$ functional groups determined by $^1H$ NMR for this copolymer is 4.5 mmol/kg.

EXAMPLE 6

"Control" Polymer F: SBR Having an SiOH Functional Group at the Chain End

Injected into a 100-litre reactor, kept under a nitrogen pressure of around 2 bar, containing 49.7 kg of cyclohexane, are 1.95 kg of stirene and 5.26 kg of butadiene and also 532 mL of a 0.0308 mol.L$^{-1}$ solution of sodium tert-amylate in cyclohexane. After neutralizing the impurities in the solution to be polymerized by addition of s-butyllithium, 512 mL of s-BuLi at 0.0598 mol.L$^{-1}$ in cyclohexane are added. The polymerization is carried out at 45° C.

After 120 min, the conversion rate of the monomers reaches 92%. This conversion rate is determined by weighing an extract dried at 110° C., under a reduced pressure of 200 mmHg.

261 mL of a 0.0586 mol.L$^{-1}$ solution of hexamethylcyclotrisiloxane in cyclohexane are then added. After 30 min at 60° C., 0.59 L of a 0.1 mol.L$^{-1}$ solution of methanol in toluene is then added. The inherent viscosity, which is measured at 25° C. at 0.1 g/dl in toluene, is 1.81 dl/g. The polymer is subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The ML viscosity of the copolymer is 65.

The molecular weight $M_n$ of this copolymer, determined by the SEC technique, is 182 000 g/mol and the $I_p$ is 1.13.

The microstructure of this copolymer F is determined by the NIR method:

The weight content of trans-1,4-units is 33%, that of the cis-1,4-units is 25% and that of the 1,2-units is 42% (each of these three contents relates to the butadiene units).

The weight content of stirene is 25%.

The content of $(CH_3)_2Si$ functional groups determined by $^1H$ NMR for this copolymer is 4.07 mmol/kg.

EXAMPLE 7

"Control" Polymer G: Non-Functional SBR

Injected into a 100-litre reactor, kept under a nitrogen pressure of around 2 bar, containing 48.0 kg of cyclohexane, are 2.39 kg of stirene and 6.46 kg of butadiene and also 772 mL of a 0.0304 mol.L$^{-1}$ solution of sodium tert-amylate in cyclohexane. After neutralizing the impurities in the solution to be polymerized by addition of s-butyllithium, 676 mL of s-BuLi at 0.0798 mol.L$^{-1}$ in cyclohexane are added. The polymerization is carried out at 45° C.

After 120 min, the conversion rate of the monomers reaches 93%. This conversion rate is determined by weighing an extract dried at 110° C., under a reduced pressure of 200 mmHg.

0.75 L of a 0.12 mol.L$^{-1}$ solution of methanol in toluene is then added. The inherent viscosity, which is measured at 25° C. at 0.1 g/dl in toluene, is 1.51 dl/g. The polymer is then subjected to an antioxidizing treatment by addition of 0.32 part per hundred parts of rubbers (phr) of 4,4'-methylenebis (2,6-tert-butylphenol) and 0.08 part per hundred parts of rubbers (phr) of N-(1,3-dimethylbutyl)-1'-phenyl-p-phenylenediamine.

The copolymer thus treated is separated from its solution by a steam-stripping operation, then it is dried on an open mill and in an oven at 60° C. under a stream of nitrogen.

The ML viscosity of the copolymer is 31.

The molecular weight $M_n$ of this copolymer, determined by the SEC technique, is 134 000 g/mol and the $I_p$ is 1.08.

The microstructure of this copolymer is determined by the NIR method:

The weight content of trans-1,4-units is 31%, that of the cis-1,4-units is 27% and that of the 1,2-units is 42% (each of these three contents relates to the butadiene units).

The weight content of stirene is 26%.

EXAMPLE 8

"Control" Polymer H: Non-Functional SBR

Injected into a 100-litre reactor, kept under a nitrogen pressure of around 2 bar, containing 48.0 kg of cyclohexane, are 2.39 kg of stirene and 6.46 kg of butadiene and also 774 mL of a 30.4 mmol.$L^{-1}$ solution of sodium tert-amylate in cyclohexane. After neutralizing the impurities in the solution to be polymerized by addition of s-butyllithium, 526 mL of s-BuLi at 0.0798 mol.$L^{-1}$ in cyclohexane are added. The polymerization is carried out at 45° C.

After 110 min, the conversion rate of the monomers reaches 90%. This conversion rate is determined by weighing an extract dried at 110° C., under a reduced pressure of 200 mmHg.

0.53 L of a 0.12 mol.$L^{-1}$ solution of methanol in toluene is then added. The inherent viscosity, which is measured at 25° C. at 0.1 g/dl in toluene, is 1.68 dl/g. The polymer is then subjected to an antioxidizing treatment by addition of 0.2 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The ML viscosity of the copolymer is 51.

The molecular weight $M_n$ of this copolymer, determined by the SEC technique, is 160 000 g/mol and the $I_p$ is 1.11.

The microstructure of this copolymer H is determined by the NIR method:

The weight content of trans-1,4-units is 31%, that of cis-1,4-units is 28% and that of 1,2-units is 41% (each of these three contents relates to the butadiene units).

The weight content of stirene is 25%.

EXAMPLE 9

Polymer I According to the Invention

Injected into a 10-litre reactor, kept under a nitrogen pressure of 2 bar, containing 4200 g of methylcyclohexane, are 162 g of stirene and 438 g of butadiene and also 0.46 mL of tetrahydrofurfuryl ether. After neutralizing the impurities in the solution to be polymerized by addition of n-butyllithium, 4.5 mmol of n-BuLi are added. The polymerization is carried out at 40° C.

After 70 min, the conversion rate of the monomers reaches 97%. This conversion rate is determined by weighing an extract dried at 110° C. under a reduced pressure of 200 mmHg. A control sample is then withdrawn from the reactor, then halted with an excess of methanol with respect to the lithium. The inherent viscosity ("initial" viscosity), which is measured at 25° C. at 0.1 g/dl in toluene, is 1.17 dl/g. The molecular weight $M_n$ of this control, determined by the SEC technique, is 94000 g/mol, the $I_p$ is 1.12.

The temperature of the reactor is increased to 60° C. and 10.8 m of a 0.2 mol.$L^{-1}$ solution of poly(ethylene glycol) diglycidyl ether (of CAS number [26403-72-5] sold by Aldrich under the reference 475696 with an $M_n$ indicated by this supplier of 526 g.$mol^{-1}$) are then injected into the previously deaerated toluene.

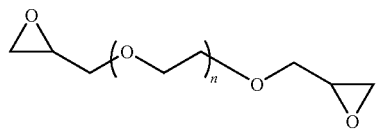

After reacting for 60 min at 60° C., the reaction is halted by addition of 6.8 mL of methanol. The "final" inherent viscosity measured is 1.77 dL/g. The jump in viscosity, defined as the ratio of said "final" viscosity to said "initial" viscosity, is 1.51 in this instance. The ML viscosity of the polymer thus coupled is 52.

The diene block copolymer I is then subjected to an antioxidizing treatment by addition of 0.8 part per 100 parts of rubbers (phr) of 4,4'-methylenebis(2,6-tert-butylphenol) and 0.2 part per 100 parts of rubbers (phr) of N-(1,3-dimethylbutyl)-N'-phenyl-p-phenylenediamine.

The copolymer thus treated is separated from its solution by a steam-stripping operation, then it is dried on an open mill at 100° C. and in an oven at 60° C. under a stream of nitrogen.

The molecular weight $M_n$ of this block copolymer I, determined by the SEC technique, is 156 000 g/mol and the $I_p$ is 1.30. The mathematical breakdown of the SEC chromatogram to the sum of Gaussian distributions (assuming that the response coefficients of the refractometric detector (dn/dc) of the various populations are identical) indicates the presence of a majority population (75% by weight) of coupled chains and of a minority population (25% by weight) of uncoupled linear chains.

The content of $OCH_2$ functional groups determined by $^1$H NMR for the copolymer I is 52 mmol/kg which, considering the theoretical molecular weight $M_n$ of the diene polymer and that of the polyethylene glycol block corresponds to a degree of functionalization by the polyether block of around 75%.

The microstructure of this copolymer I is determined by the NIR method:

The weight content of trans-1,4-units is 21%, that of cis-1,4-units is 19% and that of 1,2-units is 60% (each of these three contents relates to butadiene units).

The weight content of stirene is 27%.

EXAMPLE 10

"Control" Polymer J: SBR Having an SiOH Functional Group at the Chain End

Injected into a 100-litre reactor, kept under a nitrogen pressure of around 2 bar, containing 48.9 kg of methylcyclohexane, are 1.93 kg of stirene and 5.21 kg of butadiene and also 675 mL of a 0.065 mol.L$^{-1}$ solution of tetrahydrofurfuryl ether in methylcyclohexane. After neutralizing the impurities in the solution to be polymerized by addition of n-butyllithium, 490 mL of n-BuLi at 0.065 mol.L$^{-1}$ in methylcyclohexane are added. The polymerization is carried out at 45° C.

After 45 min, the conversion rate of the monomers reaches 92%. This conversion rate is determined by weighing an extract dried at 110° C., under a reduced pressure of 200 mmHg.

635 mL of a 0.0253 mol.L$^{-1}$ solution of hexamethylcyclotrisiloxane in methylcyclohexane are then added. After 30 min at 60° C., the polymer is subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The ML viscosity of the copolymer is 58.

The molecular weight $M_n$ of this copolymer, determined by the SEC technique, is 161 000 g/mol and the $I_p$ is 1.09.

The microstructure of this copolymer J is determined by the NIR method:

The weight content of trans-1,4-units is 20%, that of the cis-1,4-units is 19% and that of the 1,2-units is 61% (each of these three contents relates to the butadiene units).

The weight content of stirene is 25%.

The content of $(CH_3)_2Si$ functional groups determined by $^1H$ NMR for this copolymer is 3.73 mmol/kg.

EXAMPLE 11

"Control" Polymer K: Non-Functional SBR

Injected into a 100-litre reactor, kept under a nitrogen pressure of around 2 bar, containing 48.9 kg of methylcyclohexane, are 1.93 kg of stirene and 5.21 kg of butadiene and also 675 mL of a 0.065 mol.L$^{-1}$ solution of tetrahydrofurfuryl ether in methylcyclohexane. After neutralizing the impurities in the solution to be polymerized by addition of n-butyllithium, 505 mL of n-BuLi at 0.065 mol.L$^{-1}$ in methylcyclohexane are added. The polymerization is carried out at 45° C.

After 45 min, the conversion rate of the monomers reaches 92%. This conversion rate is determined by weighing an extract dried at 110° C., under a reduced pressure of 200 mmHg.

0.55 L of a 0.15 mol.L$^{-1}$ solution of methanol in toluene is then added. The inherent viscosity, which is measured at 25° C. at 0.1 g/dl in toluene, is 1.57 dl/g. The polymer is then subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill and in an oven at 60° C. under a stream of nitrogen.

The ML viscosity of the copolymer is 54.

The molecular weight $M_n$ of this copolymer, determined by the SEC technique, is 158 000 g/mol and the $I_p$ is 1.09.

The microstructure of this copolymer K is determined by the NIR method:

The weight content of trans-1,4-units is 20%, that of cis-1,4-units is 19% and that of 1,2-units is 61% (each of these three contents relates to the butadiene units).

The weight content of stirene is 26%.

II COMPARATIVE EXAMPLES OF RUBBER COMPOSITIONS

A) Measurements and Tests Used

Experimental techniques used for the characterization, before and after curing, of the rubber compositions:

(a) the Mooney viscosity ML (1+4) at 100° C.: measured according to the ASTM: D-1646 standard, entitled "Mooney" in the tables, (b) the SHORE A hardness: measurement carried out according to the DIN 53505 standard, (c) the elongation moduli at 300% (EM 300), at 100% (EM 100) and at 10% (EM 10): measurements carried out according to the ISO 37 standard, (d) the Scott fracture index at 23° C.: the breaking strength (Fr) in MPa and the elongation at break (Eb) in % are determined. All these tensile measurements are carried out under the normal temperature and hygrometry conditions according to the ISO 37 standard.

(e) the loss at 60° C.: an energy loss at 60° C. by rebound at a set energy measured at the sixth impact. The value, expressed in %, is the difference between the energy supplied and the energy restored, relative to the energy supplied.

(f) the dynamic properties Delta G* and tan(δ)max are measured on a viscoanalyzer (Metravib VA4000) according to the ASTM D 5992-96 standard. The response of a sample of vulcanized composition (cylindrical test piece with a thickness of 2 mm and a cross section of 79 mm$^2$), subjected to a sinusoidal stress in simple alternating shear, at a frequency of 10 Hz, under normal temperature conditions (23° C.) according to the ASTM D 1349-99 standard is recorded. A scan with a peak-to-peak strain amplitude ranging from 0.1 to 50% (forward cycle) then from 50% to 0.1% (return cycle) is carried out. The results gathered are the complex dynamic shear modulus (G*) and the loss factor tan δ. For the return cycle, the maximum value of tan δ observed (tan(δ)max), and also the difference in the complex modulus (Delta G*) between the values at 0.1 and 50% strain (the Payne effect) are indicated.

B) THE EXAMPLES

Example 1

Compositions comprising either an elastomer having a polyether block in the middle of the chain according to the invention or an elastomer not in accordance with the invention ($T_g$=−38° C.)

In this example, the four elastomers SBR B, SBR C, SBR G and SBR H were used for the preparation of rubber compositions B, C, G and H of tread type each comprising silica as reinforcing filler.

Each of these compositions B, C, G and H exhibits the following formulation (expressed in phr: parts per one hundred parts of elastomer):

| Elastomer | 100 |
|---|---|
| Silica (1) | 80 |
| N234 | 1 |
| MES oil (5) | 15 |
| Resin (6) | 15 |
| Bonding agent (2) | 6.4 |
| ZnO | 2.5 |
| Stearic acid | 2 |
| Antioxidant (3) | 1.9 |

-continued

| | |
|---|---|
| Antiozone wax "C32ST" (7) | 1.5 |
| Diphenylguanidine | 1.5 |
| Sulphur | 1.2 |
| Sulphenamide (4) | 2 | with:
(1) = Silica "Zeosil 1165 MP" from Rhodia,
(2) = Bonding agent "Si69" from Degussa,
(3) = N-(1,3-dimethylbutyl)-N'-phenyl-p-phenylenediamine,
(4) = N-cyclohexyl-2-benzothiazylsulphenamide,
(5) = Catenex ® SNR from Shell,
(6) = Resin Dercolyte L120 from DRT or Sylvagum TR7125C from Arizona,
(7) = Antiozone wax from Repsol.

Each of the following compositions is prepared, in a first step of thermomechanical working, by two stages separated by a cooling phase and then, in a second finishing step, by mechanical working.

The elastomer, two thirds of the reinforcing filler, the coupling agent and the diphenylguanidine, then, approximately one minute later, the remainder of the reinforcing filler, the MES oil, the resin, the stearic acid and the antiozone wax "C32ST" are successively introduced into a laboratory internal mixer of "Banbury" type, the capacity of which is 400 cm$^3$, which is 70% filled and which has a starting temperature of approximately 90° C.

The first stage of thermomechanical working is carried out for 4 to 5 minutes up to a maximum dropping temperature of approximately 160° C. The elastomer block is then recovered and cooled.

A second stage of thermomechanical working is then carried out in the same mixer for a time of 3 to 4 minutes, with the addition of the zinc monoxide and the antioxidant, up to a maximum dropping temperature of approximately 160° C.

The first abovementioned step of thermomechanical working is thus carried out, it being specified that the mean speed of the blades during this first step is 45 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tires, in particular for treads.

Crosslinking is carried out at 150° C. for 40 min.
The results are recorded in Table 1 below.

TABLE 1

| | Composition | | | |
|---|---|---|---|---|
| | B | C | G | H |
| Elastomer | SBR B | SBR C | SBR G | SBR H |
| ML (1 + 4) at 100° C. (elastomer) | 34 | 53 | 31 | 51 |
| Properties in the uncrosslinked state | | | | |
| ML (1 + 4) at 100° C. ("Mooney mixture") | 54 | 68 | 66 | 83 |
| Properties in the crosslinked state | | | | |
| Shore A | 56.8 | 57.6 | 57.9 | 59.5 |
| EM10 | 3.54 | 3.54 | 3.47 | 3.73 |

TABLE 1-continued

| | Composition | | | |
|---|---|---|---|---|
| | B | C | G | H |
| EM100 | 1.63 | 1.72 | 1.52 | 1.61 |
| EM300 | 2.33 | 2.49 | 2.09 | 2.21 |
| EM300/EM100 | 1.43 | 1.45 | 1.38 | 1.37 |
| Scott fracture index at 23° C. | | | | |
| Fr (MPa) | 22.8 | 23.7 | 22.3 | 22.1 |
| Eb (%) | 528 | 512 | 557 | 521 |
| Losses 60° C. (%) | 26.2 | 23.0 | 27.1 | 24.8 |
| Dynamic properties as a function of the strain | | | | |
| Delta G* (MPa) at 23° C. | 0.57 | 0.69 | 1.27 | 1.08 |
| Tan (δ) max at 23° C. | 0.187 | 0.193 | 0.259 | 0.241 |

It should be noted that composition B according to the invention exhibits a Mooney "mixture" value which is lower than that of composition G based on a non-functional elastomer. Composition C according to the invention exhibits a Mooney "mixture" value which is lower than that of composition H based on a non-functional elastomer. The elastomers B and C, comprising a polyether block in the middle of the chain according to the invention, make it possible to improve the processing respectively, relative to the non-functional elastomers G and H.

As regards the properties in the crosslinked state, it should be noted that the EM300/EM100 ratio of composition B according to the invention is slightly greater than that of composition G based on a non-functional elastomer. The EM300/EM100 ratio of composition C according to the invention is slightly greater than that of composition H based on a non-functional elastomer. The elastomers B and C, comprising a polyether block in the middle of the chain according to the invention, make it possible to slightly improve the reinforcing respectively, relative to the non-functional elastomers G and H.

As regards the dynamic properties, it should be noted that the values of Delta G* and of tan $\delta_{max}$ of composition B according to the invention are substantially lower than those of composition G based on a non-functional elastomer. The values of Delta G* and of tan $\delta_{max}$ of composition C according to the invention are substantially lower than those of composition H based on a non-functional elastomer. The elastomers B and C, comprising a polyether block in the middle of the chain according to the invention, make it possible to improve the hysteresis properties (Delta G*, tan $\delta_{max}$) respectively, relative to the non-functional elastomers G and H.

In other words, composition B according to the invention based on an elastomer which comprises a polyether block in the middle of the chain exhibits rubber properties in the uncrosslinked state and in the crosslinked state which are improved with respect to those of composition G based on a non-functional elastomer as a result of an improved ability to be processed and as a result of a substantially reduced hysteresis. The composition C according to the invention based on an elastomer which comprises a polyether block in the middle of the chain exhibits rubber properties in the uncrosslinked state and in the crosslinked state that are improved with respect to those of composition H based on a non-functional elastomer as a result of an improved ability to be processed and as a result of a substantially reduced hysteresis.

Example 2

Compositions comprising either an elastomer having a polyether block in the middle of the chain according to the invention or an elastomer not in accordance with the invention ($T_g$=−38° C.)

In this example, the four elastomers SBR B, SBR D, SBR E and SBR F were used for the preparation of rubber compositions B, D, E and F of tread type each comprising silica as reinforcing filler.

Each of these compositions B, D, E and F exhibits the following formulation (expressed in phr: parts per one hundred parts of elastomer):

| | |
|---|---|
| Elastomer | 100 |
| Silica (1) | 80 |
| N234 | 1 |
| MES oil (5) | 15 |
| Resin (6) | 15 |
| Bonding agent (2) | 6.4 |
| ZnO | 2.5 |
| Stearic acid | 2 |
| Antioxidant (3) | 1.9 |
| Antiozone wax "C32ST" (7) | 1.5 |
| Diphenylguanidine | 1.5 |
| Sulphur | 1.2 |
| Sulphenamide (4) | 2 | with:
(1) = Silica "Zeosil 1165 MP" from Rhodia,
(2) = Bonding agent "Si69" from Degussa,
(3) = N-(1,3-dimethylbutyl)-N'-phenyl-p-phenylenediamine,
(4) = N-cyclohexyl-2-benzothiazylsulphenamide,
(5) = Catenex ® SNR from Shell,
(6) = Resin Dercolyte L120 from DRT or Sylvagum TR7125C from Arizona,
(7) = Antiozone wax from Repsol.

Each of the following compositions is prepared, in a first step of thermomechanical working, by two stages separated by a cooling phase and then, in a second finishing step, by mechanical working.

The elastomer, two thirds of the reinforcing filler, the coupling agent and the diphenylguanidine, then, approximately one minute later, the remainder of the reinforcing filler, the MES oil, the resin, the stearic acid and the antiozone wax "C32ST" are successively introduced into a laboratory internal mixer of "Banbury" type, the capacity of which is 400 cm³, which is 70% filled and which has a starting temperature of approximately 90° C.

The first stage of thermomechanical working is carried out for 4 to 5 minutes up to a maximum dropping temperature of approximately 160° C. The elastomer block is then recovered and cooled.

A second stage of thermomechanical working is then carried out in the same mixer for a time of 3 to 4 minutes, with the addition of the zinc monoxide and the antioxidant, up to a maximum dropping temperature of approximately 160° C.

The first abovementioned step of thermomechanical working is thus carried out, it being specified that the mean speed of the blades during this first step is 45 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tires, in particular for treads.

Crosslinking is carried out at 150° C. for 40 min.

The results are recorded in Table 2 below.

TABLE 2

| | Composition | | | |
|---|---|---|---|---|
| | B | D | E | F |
| Elastomer | SBR B | SBR D | SBR E | SBA F |
| ML (1 + 4) at 100° C. (elastomer) | 34 | 66 | 31 | 65 |
| Properties in the uncrosslinked state | | | | |
| ML (1 + 4) at 100° C. ("Mooney mixture") | 54 | 76 | 97 | 116 |
| Properties in the crosslinked state | | | | |
| Shore A | 56.8 | 59.3 | 59.1 | 62.3 |
| EM10 | 3.54 | 3.66 | 3.51 | 4.35 |
| EM100 | 1.63 | 1.78 | 1.70 | 1.78 |
| EM300 | 2.33 | 2.60 | 2.35 | 2.32 |
| EM300/EM100 | 1.43 | 1.46 | 1.38 | 1.30 |
| Scott fracture index at 23° C. | | | | |
| Fr (MPa) | 22.8 | 23.9 | 23.3 | 24.8 |
| Eb (%) | 528 | 505 | 504 | 545 |
| Losses 60° C. (%) | 26.2 | 22.1 | 21.0 | 21.5 |
| Dynamic properties as a function of the strain | | | | |
| Delta G* (MPa) at 23° C. | 0.57 | 0.86 | 0.84 | 1.53 |
| Tan (δ) max at 23° C. | 0.187 | 0.218 | 0.222 | 0.260 |

It should be noted that composition B according to the invention exhibits a Mooney "mixture" value which is very substantially lower than that of composition E based on an elastomer which comprises an SiOH functional group at the chain end. Composition D according to the invention exhibits a Mooney "mixture" value which is very substantially lower than that of composition F based on an elastomer which comprises an SiOH functional group at the chain end. The elastomers B and D, comprising a polyether block in the middle of the chain according to the invention, make it possible to very substantially improve the processing respectively, relative to the elastomers E and F which comprise an SiOH functional group at the chain end.

As regards the properties in the crosslinked state, it should be noted that the EM300/EM100 ratio of composition B according to the invention is slightly greater than that of composition E based on an elastomer which comprises an SiOH functional group at the chain end. The EM300/EM100 ratio of composition D according to the invention is slightly greater than that of composition F based on an elastomer which comprises an SiOH functional group at the chain end. The elastomers B and D, comprising a polyether block in the middle of the chain according to the invention, make it possible to slightly improve the reinforcing respectively, relative to the elastomers E and F which comprise an SiOH functional group at the chain end.

As regards the dynamic properties, it should be noted that the values of Delta G* and of tan $\delta_{max}$ of composition B according to the invention are lower than those of composition E based on an elastomer which comprises an SiOH functional group at the chain end. The values of Delta G* and of tan $\delta_{max}$ of composition D according to the invention are lower than those of composition F based on an elastomer which comprises an SiOH functional group at the chain end. The elastomers B and D, comprising a polyether block in the middle of the chain according to the invention, make it possible to improve the hysteresis properties (Delta G*, tan $\delta_{max}$) respectively, relative to the elastomers E and F which comprise an SiOH functional group at the chain end.

In other words, composition B according to the invention based on an elastomer which comprises a polyether block in the middle of the chain exhibits rubber properties in the uncrosslinked state and in the crosslinked state which are improved with respect to those of composition E based on an elastomer which comprises an SiOH functional group at the chain end as a result of a very substantially improved ability to be processed and as a result of reduced hysteresis. The composition D according to the invention based on an elastomer which comprises a polyether block in the middle of the chain exhibits rubber properties in the uncrosslinked state and in the crosslinked state that are improved with respect to those of composition F based on an elastomer which comprises an SiOH functional group at the chain end as a result of a very substantially improved ability to be processed and as a result of a reduced hysteresis.

Example 3

Compositions comprising either an elastomer having a polyether block in the middle of the chain according to the invention or an elastomer not in accordance with the invention ($T_g$=−25° C.)

In this example, the three elastomers SBR I, SBR J and SBR K were used for the preparation of rubber compositions I, J and K of tread type each comprising silica as reinforcing filler.

Each of these compositions I, J and K exhibits the following formulation (expressed in phr: parts per one hundred parts of elastomer):

| | |
|---|---|
| Elastomer | 100 |
| Silica (1) | 80 |
| N234 | 1 |
| MES oil (5) | 15 |
| Resin (6) | 15 |
| Bonding agent (2) | 6.4 |
| ZnO | 2.5 |
| Stearic acid | 2 |
| Antioxidant (3) | 1.9 |
| Antiozone wax "C32ST" (7) | 1.5 |
| Diphenylguanidine | 1.5 |
| Sulphur | 1.2 |
| Sulphenamide (4) | 2 | with:
(1) = Silica "Zeosil 1165 MP" from Rhodia,
(2) = Bonding agent "Si69" from Degussa,
(3) = N-(1,3-dimethylbutyl)-N'-phenyl-p-phenylenediamine,
(4) = N-cyclohexyl-2-benzothiazylsulphenamide,
(5) = Catenex ® SNR from Shell,
(6) = Resin Dercolyte L120 from DRT or Sylvagum TR7125C from Arizona,
(7) = Antiozone wax from Repsol.

Each of the following compositions is prepared, in a first step, by thermomechanical working, then, in a second finishing step, by mechanical working.

The elastomer, two thirds of the reinforcing filler, the coupling agent and the diphenylguanidine, then, approximately one minute later, the remainder of the reinforcing filler, the MES oil, the resin, the antioxidant, the stearic acid and the antiozone wax "C32ST", then, approximately two minutes later, the zinc monoxide are successively introduced into a laboratory internal mixer of "Banbury" type, the capacity of which is 400 cm³, which is 70% filled and which has a starting temperature of approximately 90° C.

The stage of thermomechanical working is carried out for 4 to 5 minutes up to a maximum dropping temperature of approximately 160° C.

The first abovementioned step of thermomechanical working is thus carried out, it being specified that the mean speed of the blades during this first step is 45 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tires, in particular for treads.

Crosslinking is carried out at 150° C. for 40 min.

The results are recorded in Table 3 below.

TABLE 3

| | Composition | | |
|---|---|---|---|
| | I | J | K |
| Elastomer | SBR I | SBR J | SBR K |
| ML (1 + 4) at 100° C. (elastomer) | 52 | 58 | 54 |
| Properties in the uncrosslinked state | | | |
| MS (1 + 4) at 100° C. ("Mooney mixture") | 61 | 108 | 78 |
| Properties in the crosslinked state | | | |
| Shore A | 64.1 | 63.9 | 70.2 |
| EM10 | 5.30 | 4.64 | 7.05 |
| EM100 | 2.22 | 2.23 | 2.16 |
| EM300 | 2.70 | 2.78 | 2.21 |
| EM300/EM100 | 1.21 | 1.25 | 1.02 |
| Scott fracture index at 23° C. | | | |
| Fr (MPa) | 19.4 | 19.7 | 18.0 |
| Eb (%) | 437 | 413 | 490 |
| Losses 60° C. (%) | 28.9 | 21.8 | 36.3 |
| Dynamic properties as a function of the strain | | | |
| Delta G* (MPa) at 23° C. | 1.67 | 1.67 | 6.58 |
| Tan (δ) max at 23° C. | 0.333 | 0.367 | 0.476 |

It should be noted that composition I according to the invention exhibits a Mooney "mixture" value which is very substantially lower than that of composition J based on an elastomer which comprises an SiOH functional group at the chain end. Composition I according to the invention exhibits a Mooney "mixture" value which is lower than that of composition K based on a non-functional elastomer. The elastomer comprising a polyether block in the middle of the chain according to the invention makes it possible to improve the processing with respect to the non-functional elastomer on the one hand and with respect to the elastomer having an SiOH functional group at the chain end on the other hand.

As regards the properties in the crosslinked state, it should be noted that the EM300/EM100 ratio of composition I according to the invention is equivalent to that of composition J based on an elastomer which comprises an SiOH functional group at the chain end. Composition I according to the invention exhibits an EM300/EM100 ratio which is greater than that of composition K based on a non-functional elastomer. The elastomer comprising a polyether block in the middle of the chain according to the invention makes it possible to improve the reinforcing with respect to the non-functional elastomer.

As regards the dynamic properties, it should be noted that the value of Delta G* of composition I according to the invention is equivalent to that of composition J based on an elastomer which comprises an SiOH functional group at the chain end, whereas the value of tan $\delta_{max}$ of composition I according to the invention is lower than that of tan $\delta_{max}$ of composition J.

The composition I according to the invention exhibits values of Delta G* and of tan $\delta_{max}$ that are lower than those of composition K based on a non-functional elastomer. The elastomer comprising a polyether block in the middle of the chain according to the invention makes it possible to improve the hysteresis properties (Delta G*, tan $\delta_{max}$) with respect to the non-functional elastomer.

In other words, composition I according to the invention based on an elastomer which comprises a polyether block in the middle of the chain exhibits rubber properties in the uncrosslinked state and in the crosslinked state which are improved with respect to those of composition J based on an elastomer comprising an SiOH functional group at the chain end as a result of an improved processability on the one hand, and with respect to those of composition K based on a non-functional elastomer as a result of a reduced hysteresis on the other hand.

The invention claimed is:

1. A process for preparing a block copolymer, of which at least one of said blocks is constituted of a diene elastomer and at least another of said blocks is constituted of a polyether, wherein the process comprises a step of reacting a living diene elastomer with a functionalizing agent of general formula I having a functional polyether block of number-average molecular weight approximately from 100 to 5000 g/mol,

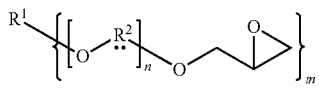

Formula I in which:
- $R^1$ represents a saturated aliphatic hydrocarbon radical of valence m having 1 to 15 carbon atoms, an unsubstituted aromatic hydrocarbon radical of valence m having 6 to 15 carbon atoms or an aryl-substituted saturated aliphatic hydrocarbon radical of valence m having 7 to 15 carbon atoms;
- $R^2$ represents a $C_1$-$C_{10}$ alkylene radical;
- n is an integer from 2 to 60;
- m is an integer from 1 to 4; and
- wherein the living diene elastomer is obtained by anionic polymerization using an organolithium initiator.

2. The process according to claim 1, wherein in the general formula I, m is equal to 2.

3. The process according to claim 1, wherein in the general formula I, $R^2$ represents the

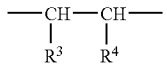

radical, in which $R^3$ and $R^4$ are, independently of one another, a hydrogen atom or a $C_1$-$C_4$ alkyl radical.

4. The process according to claim 3, wherein in the general formula I, $R^2$ represents the ethylene radical.

5. The process according to claim 4, wherein the functionalizing agent of general formula I is polyethylene glycol diglycidyl ether.

6. The process according to claim 1, wherein prior to the step of reacting a living diene elastomer with a functionalizing agent of general formula I, the process comprises a step of preparing the living polymer by anionic polymerization of at least one diene monomer in the presence of a monofunctional organolithium initiator.

7. The process according to claim 1, further comprising a step of coupling and/or of star-branching and/or else of supplementary functionalization with a functionalizing agent different from that of general formula I.

8. A diene block copolymer, of which at least one of said blocks is constituted of a diene elastomer and at least another of said blocks is constituted of a polyether of number-average molecular weight approximately from 100 to 5000 g/mol, obtained by the process according to claim 1.

9. The diene block copolymer according to claim 8, comprising three blocks, the block constituted of a polyether being located in the middle of the polymer chain between two blocks constituted of a diene elastomer.

10. The diene block copolymer according to claim 8, wherein the diene elastomer is a styrene/butadiene copolymer.

11. A reinforced rubber composition, for use in the manufacture of a pneumatic tire, based on at least one diene block copolymer obtained according to the process of claim 1 and adapted to interact with the reinforcing filler.

12. The rubber composition according to claim 11, comprising predominantly a reinforcing inorganic filler as a reinforcing filler.

13. The rubber composition according to claim 12, wherein the reinforcing filler is constituted by the reinforcing inorganic filler.

14. The rubber composition according to claim 12, wherein the reinforcing inorganic filler is silica.

15. The rubber composition according to claim 11, wherein the reinforcing filler comprises carbon black.

16. The rubber composition according to claim 11, comprising, as a blend with said diene block copolymer, at least one of the polymers chosen from natural rubber, synthetic diene elastomers, synthetic diene elastomers that are coupled and/or star-branched and/or partially or completely functionalized by a functionalizing agent different from that represented by the general formula I, and synthetic elastomers other than diene elastomers.

17. A tire, incorporating, in at least one of its constituent components, a rubber composition according to claim 11.

18. A tread for a tire wherein the tire and the tread comprise a rubber composition according to claim 11.

* * * * *